United States Patent [19]

Tiquet et al.

[11] 3,869,489

[45] Mar. 4, 1975

[54] PROCESS OF MANUFACTURING TERT.-BUTYL P-TERT. BUTYLPERBENZOATE

[75] Inventors: Jacques Tiquet; Jean-Louis Cros, both of Verneuil-en-Halatte, France

[73] Assignee: Societe Chimique des Charbonnages, Courbevoie, France

[22] Filed: July 3, 1973

[21] Appl. No.: 376,215

[30] Foreign Application Priority Data
July 5, 1972    France ............................... 72.24371

[52] U.S. Cl. ........................ 260/453 R, 260/93.5 R
[51] Int. Cl. ............................................. C07c 73/10
[58] Field of Search ............................... 260/453 R

[56] References Cited
UNITED STATES PATENTS
3,082,236   3/1963   Mageli et al. ................... 260/453 R FOREIGN PATENTS OR APPLICATIONS
1,234,725   2/1967   Germany......................... 260/453 R
746,919   11/1966   Canada............................ 260/453 R
534,709   12/1956   Canada............................ 260/453 R

OTHER PUBLICATIONS

Bentrude et al., "Anchimerically Accelerated Bond etc.," (1961), JACS 84, pp. 1561–1571, (1962).
Antonovskii et al., "Effect of the Peroxy Ester Acid etc.," (1968), Zh. Org. Khimi 5, pp. 42–44, (1969).

Primary Examiner—Glennon H. Hollrah
Attorney, Agent, or Firm—Karl W. Flocks

[57]         ABSTRACT

Process for manufacturing tertiarybutylp-tertiarybutyl perbenzoate at least 99 percent pure. The process consists in reacting 4-tertiarybutyl benzoic acid chloride with an alkaline solution of a tertiarylbutyl peroxide salt at a temperature comprised between 40° and 45°C possibly in the presence of a surfactant.

4 Claims, No Drawings

PROCESS OF MANUFACTURING TERT.-BUTYL P-TERT. BUTYLPERBENZOATE

The present invention relates, as a new industrial product, to tertiary butyl-p-tertiary butyl perbenzoate having the formula

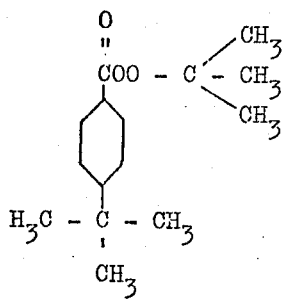

It also relates to a process for manufacturing this compound from 4-tertiary butyl benzoic acid chloride.

The process according to the invention consists in reacting the 4-tertiary butyl benzoic acid chloride, a compound that is industrially manufactured, with a tert.butyl hydroperoxide salt, at a relatively high temperature.

A relatively high temperature is taken to mean a temperature in the order of 40° to 45°C. In fact, it is known that reactions between an acid chloride and a peroxide compound are usually carried out at temperatures below 10°C. Temperatures considerably higher than 45°C are excluded owing to the risk of decomposition of the initial peroxide compound and the product resulting from the reaction.

Sodium salt will be given as an example of a tert.-butyl hydroperoxide salt. According to a preferred application of the process according to the invention, the tert.butyl hydroperoxide salt is added in two stages. The majority of the tert.butyl hydroperoxide salt is first introduced into the reactor, then 4-tertiary butyl benzoic acid chloride is added at a rate such that the temperature remains in the range of 40°–45°C and when the majority of the acid chloride has reacted, the rest of the tert.butyl hydroperoxide salt is added.

The reaction can be carried out in the presence of a small quantity of surfactant. Suitable surfactants are those whose presence is compatible with the reaction products and in particular alkylaryl-sulphonate type surfactants.

The tert.butyl-p-tert.butyl perbenzoate according to the invention can be used in particular as a polymerization catalyst. Its thermal stability, which is slightly below that of tert.butyl perbenzoate, makes it valuable for low temperature polymerization applications (polyesters, polystyrene . . . ).

The following examples are given for the purpose of illustrating the invention.

EXAMPLE 1

28.5 g of 70 percent tert.butyl hydroperoxide (0.22 mole) is dissolved in 92 g of 10 percent sodium hydroxide solution (0.23 mole). The hydroperoxide is introduced over a 30 minute period and stirring of the reaction medium continues for 30 minutes, the temperature being maintained at approximately 10°C. After decantation and washing with pentane, 112 g of a sodium hydroxide solution of the sodium salt of tert.butyl hydroperoxide are obtained.

106 g of this solution, together with 1 ml of a 1 percent solution of alkylaryl sulphonate commercially known as "Erganol" are placed in a 500 ml flask. 0.2 mole of 4-tertiary butyl benzoic acid chloride is slowly introduced, the temperature being maintained between 40° and 45°C. Stirring is continued for 75 minutes and the remaining sodium hydroxide solution (i.e. 6 g) is then added. Stirring of the reaction medium is continued for 60 minutes at 40°–45°C. The organic phase is treated for 45 minutes at ambient temperature with its own weight of 8 percent sodium hydroxide solution, it is washed twice for 45 minutes with its own volume of water and dried on sodium sulphate.

The tert.butyl-p-tertiobutyl perbenzoate obtained is 99.5 percent pure and contains less than 0.01 percent of chlorine. It is a colourless liquid with a density at 20°C of 0.996 and a refractive index of $n_D^{20} = 1.4972$. The yield is 87 percent in relation to the acid chloride.

EXAMPLE 2

The reaction is carried out like in example 1 without any alkylaryl sulphonate introduced. The tert.butyl-p-tertiobutyl perbenzoate obtained is then 99 percent pure and contains less than 0.02 percent of chlorine. The yield remains equal to 87 percent in relation to the acid chloride.

It is understood that the present invention has been described in a purely explanatory and in no way limitative manner and that any useful modification may be made thereto without departing from its scope as defined by the following claims.

We claim:

1. In a process for manufacturing tert. butyl-4-tert. butyl perbenzoate having the formula

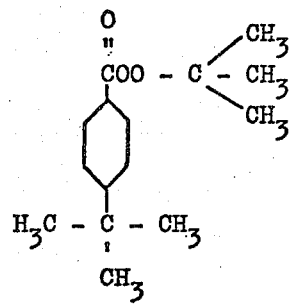

comprising reacting 4-tert. butyl benzoic acid chloride with an aqueous alkaline solution of a tert. butyl hydroperoxide salt,
   the improvement comprising carrying out said reaction at a temperature between 40° and 45°C.

2. Process according to claim 1 wherein said alkaline solution of the tert.butyl hydroperoxide salt is a sodium hydroxide solution of the tert.butyl hydroperoxide sodium salt.

3. Process according to claim 1 wherein the tert.butyl hydroperoxide salt is first reacted with said 4-tert.butyl benzoic acid chloride and an excess of said salt is then added after said acid chloride has reacted.

4. Process according to claim 1 wherein the reaction is carried out in the presence of a surfactant compatible with the reaction medium and selected from the group consisting of alkylary sulphonates.

* * * * *